(12) United States Patent
Yazaki et al.

(10) Patent No.: US 9,946,948 B2
(45) Date of Patent: Apr. 17, 2018

(54) ARTICLE DELIVERY SYSTEM

(71) Applicant: Panasonic Intellectual Property Management Co., Ltd., Osaka (JP)

(72) Inventors: Hiroshi Yazaki, Fukuoka (JP); Mihoko Okada, Fukuoka (JP); Shinichi Tsukahara, Fukuoka (JP); Marie Kuwahara, Fukuoka (JP); Junko Noda, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 87 days.

(21) Appl. No.: 15/007,793

(22) Filed: Jan. 27, 2016

(65) Prior Publication Data

US 2016/0247039 A1 Aug. 25, 2016

(30) Foreign Application Priority Data

Feb. 19, 2015 (JP) ................. 2015-030792

(51) Int. Cl.
| | |
|---|---|
| *G06K 9/34* | (2006.01) |
| *G06K 9/00* | (2006.01) |
| *G06K 9/20* | (2006.01) |
| *G06Q 10/08* | (2012.01) |
| *G08B 13/196* | (2006.01) |
| *G06Q 50/04* | (2012.01) |
| *H04N 5/232* | (2006.01) |

(52) U.S. Cl.
CPC ......... *G06K 9/342* (2013.01); *G06K 9/00369* (2013.01); *G06K 9/00771* (2013.01); *G06K 9/2054* (2013.01); *G06Q 10/08* (2013.01); *G06Q 50/04* (2013.01); *G08B 13/19686* (2013.01); *H04N 5/23219* (2013.01); *Y02P 90/30* (2015.11)

(58) Field of Classification Search
CPC .......... G06K 9/00369; G06K 9/00771; G06K 9/2054; G06K 9/342; Y02P 90/30; G08B 13/19686; G06Q 50/04; G06Q 10/08; H04N 5/23219
See application file for complete search history.

(56) References Cited

U.S. PATENT DOCUMENTS

| | | | |
|---|---|---|---|
| 2005/0180595 A1 | 8/2005 | Horii et al. | |
| 2007/0237364 A1* | 10/2007 | Song | G06K 9/00369 382/115 |
| 2010/0328460 A1 | 12/2010 | Merkel et al. | |
| 2013/0004090 A1* | 1/2013 | Kundu | G07F 19/207 382/232 |

FOREIGN PATENT DOCUMENTS

JP 2001-186507 A 7/2001

OTHER PUBLICATIONS

Extended European Search Report, dated Jul. 6, 2016, for corresponding EP Application No. 16152016.8—1955, 8 pages.

\* cited by examiner

*Primary Examiner* — Sean Conner
*Assistant Examiner* — Pinalben Patel
(74) *Attorney, Agent, or Firm* — Seed IP Law Group LLP

(57) ABSTRACT

When monitoring a logistics line and outputting a video image on a display, a privacy-protected video image processor uses an image of a first specific region corresponding to an area of the logistics line as it is among an original image captured by a capture, and performs mask processing on a person detected in an image of a region other than the first specific region.

4 Claims, 9 Drawing Sheets

ARTICLE DELIVERY SYSTEM

BACKGROUND OF THE INVENTION

1. Field of the Invention

The present invention relates to an article delivery system in which an article delivery area is imaged by a monitoring camera.

2. Description of the Related Art

In an article delivery system in the related art, in a case where there is a loss, damage, or the like in luggage in a logistics line to transport articles using a belt conveyer or the like, a place where the accident occurs has been determined by a person seeing video images. At this time, since a person is reflected in the video image, from the point of view of privacy protection, the person seeing the video image is limited to an authorized person such as an officer, and furthermore, the authorized person has entered a security room and visually checked the video image.

As a related art like this type, a technology is known, in which concealment processing is performed on a privacy involved region included in the video image of the inside of a building. For example, in Japanese Patent Unexamined Publication No. 2001-186507, video information of the inside of the building or in the vicinity of the building is delivered to an image display terminal installed in the inside of the building or in the vicinity of the building, the concealment processing is performed on a portrait right involved region or the privacy involved region of the video information, and in a case where it is confirmed that the person seeing the image display terminal has a legitimate right, the video information on which the concealment processing is not performed is delivered to the image display terminal.

However, when applying the configuration of Japanese Patent Unexamined Publication No. 2001-186507 to the article delivery system described above, in a case where there is a loss, damage, or the like in luggage in a logistics line, if authorized one person visually checks the video image, it is assumed that it takes time and there may be a case of not being aware of the accident, and thus, it has not been possible to efficiently check the video image. Therefore, it is desirable that many staff members (employees) check the video image, but if many staff members view the video image, it is difficult to protect the privacy of a person present in the video image because the image of the person is included in the video image.

In addition, in the area, there is a range which needs to be constantly monitored such as the logistics line, and the image obtained by imaging such a range must not deteriorate by the concealment processing or the like.

SUMMARY OF THE INVENTION

The present disclosure has an object to provide an article delivery system with which an image of an area can be efficiently and rapidly checked by many persons seeing the image while the image obtained by imaging a range set in the area does not deteriorate and privacy protection can be achieved.

The present disclosure provides an article delivery system including a monitoring camera and at least one display. The monitoring camera includes a capture that captures an image of an area, and an image processor that detects a person included in the image of the area captured by the capture. In a case where the area is a first area relating to an article delivery, the image processor extracts an image of a first specific region corresponding to a first range set in the first area from the image of the first area captured by the capture, performs processing treatment on the person detected by the image processor in the image of the region other than the first specific region of the image of the first area, and outputs a composite image to the display, in which the image of a region other than the first specific region in which the processing treatment is performed on the person and the extracted image of the first specific region are composed.

According to the present disclosure, it is possible to efficiently and rapidly check the video image of the area by many persons seeing the video image while suppressing the deterioration of the image obtained by imaging the range set in the area and attempting the protection of the privacy.

DETAILED DESCRIPTION OF THE PREFERRED EMBODIMENT

Hereinafter, an embodiment (hereafter, referred to as "the present embodiment") in which an article delivery system in the present invention is specifically disclosed will be described with reference to the drawings. The article delivery system in the present embodiment includes a monitoring camera system that monitors a logistics line in which a belt conveyor which transports articles is installed as a line of motion and an inspection station as a line of no-motion. In the description below, the line of motion is not limited to the logistics line in which a belt conveyor is installed and the line of no-motion is not limited to the inspection station.

Figure 1:
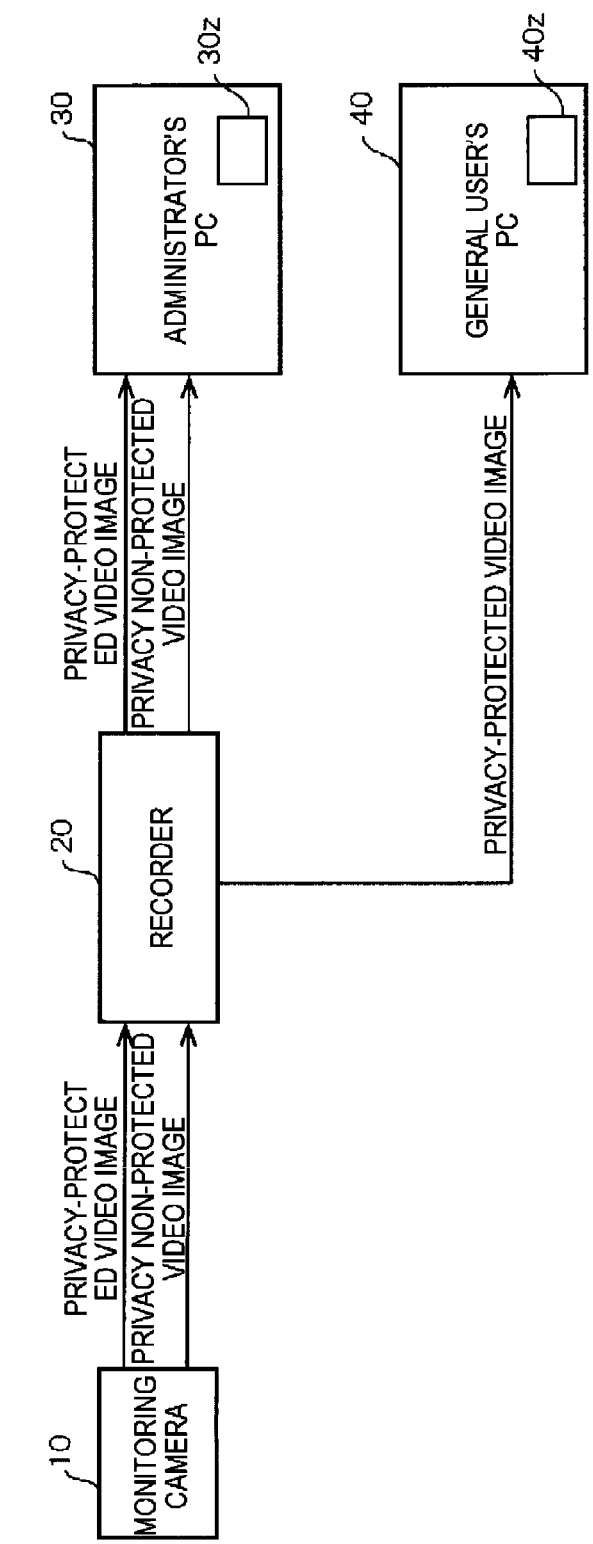
FIG. 1 is a block diagram illustrating a configuration of a monitoring camera system in the present embodiment.

FIG. 1 is a block diagram illustrating a configuration of monitoring camera system 5 in the present embodiment. Monitoring camera system 5 includes monitoring camera 10, recorder 20, administrator's PC 30, and general user's PC 40.

Monitoring camera 10 is a fixed camera of which an angle of view is fixed, and captures video images (including still pictures or moving pictures) around a certain point (place) in the target monitoring area (similar to the descriptions below). Monitoring camera 10 can output the video image (privacy-protected video image) in which mask (concealment) processing is performed on a person included in the captured video image and the video image as the captured image itself (privacy non-protected video image). Monitoring camera 10 may be a PTZ camera having functions of panning, tilting, and zooming to capture the area variably, or may be an omni-directional camera which can obtain omni-directional images.

Recorder 20 stores or relays data of the privacy-protected video image and the privacy non-protected video image output from monitoring camera 10. The data of the privacy-protected video image and the privacy non-protected video image output from monitoring camera 10 may be directly distributed to software for administrative operation of the camera and recorder of PCs 30 and 40 (that is, the administrator's PC 30 and the general user's PC 40) without passing through recorder 20. In addition, the direct distribution of the data of the privacy-protected video image and the privacy non-protected video image may be limited by controlling the authority of the user. For example, the data of the privacy-protected video image is directly distributed only to administrator's PC 30 and the data of the privacy non-protected video image is directly distributed to administrator's PC 30 and the general user's PC 40.

Administrator's PC 30 is a personal computer (PC) used by an officer (administrator) of monitoring operation, includes display 30z which can display any of the privacy non-protected video image and the privacy-protected video image output from monitoring camera 10 and functions as a monitoring device (monitor) by executing the software for the administrative operation of the camera and recorder operation.

General user's PC 40 is a PC used by, for example, a staff member (a general user) for the monitoring operation, includes display 40z which can display the privacy-protected video image output from monitoring camera 10, and similarly to administrator's PC 30, functions as the monitoring device (monitor) by executing the software for the administrative operation of the camera and recorder operation.

The specification of PC 30 and PC 40 may be the same or may be different from each other. For example, administrator's PC 30 may have a specification that enables the administrator to intensively view the privacy non-protected video image by making a resolution of the display of administrator's PC 30 higher or making a screen size larger than those of general user's PC 40. In addition, PC 30 and PC 40 may be the same PC so as to be used in a switched manner. In this case, when the privacy non-protected video image is displayed, the administrator (authorized person) needs to perform a predetermined input operation. In addition, PCs 30 and 40 can display not only the video image from one monitoring camera but also the video image from a plurality of monitoring cameras on a multi-screen video.

Figure 2:
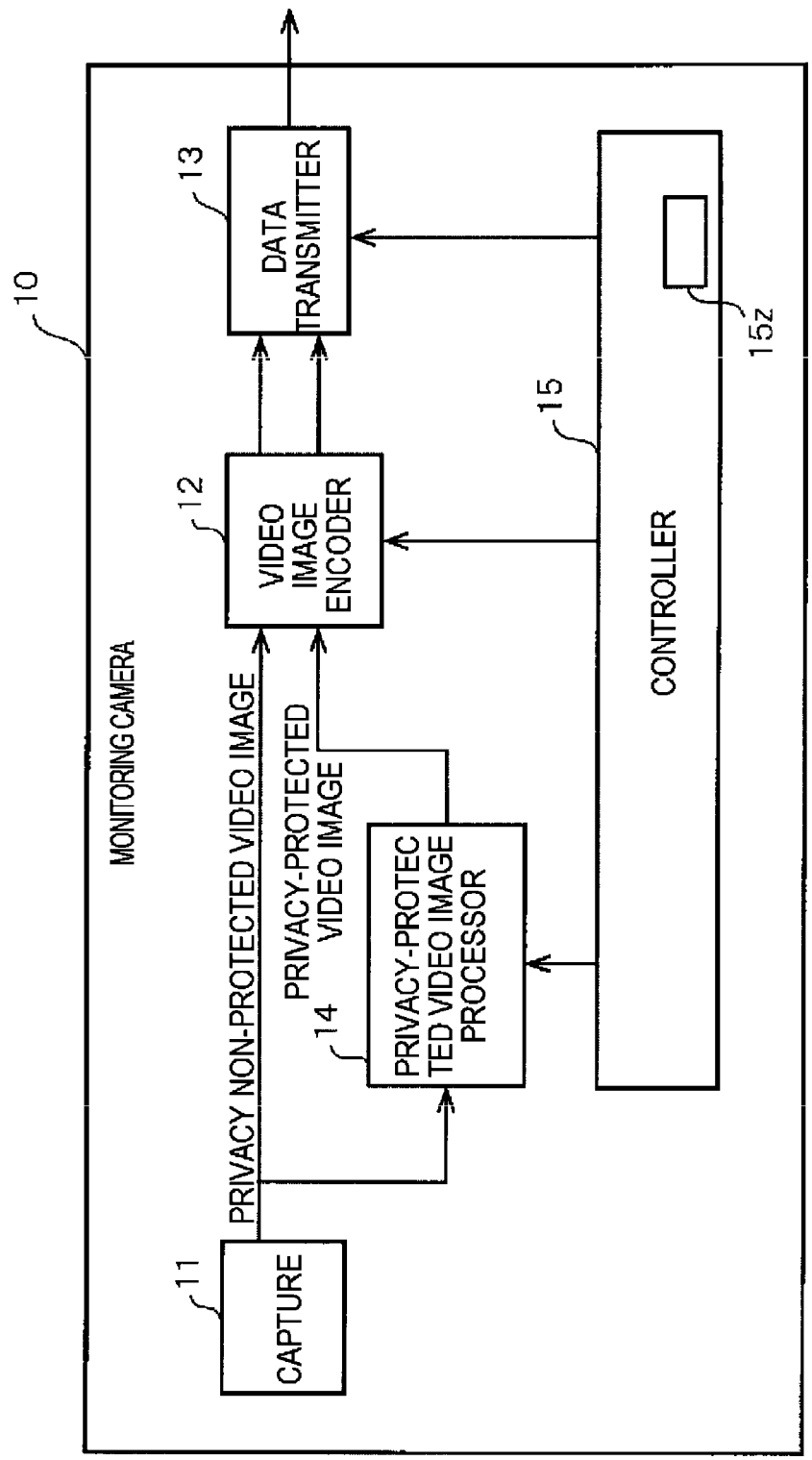
FIG. 2 is a block diagram illustrating an example of an internal configuration of a monitoring camera in the present embodiment.

FIG. 2 is a block diagram illustrating an example of an internal configuration of monitoring camera 10 in the present embodiment. Monitoring camera 10 includes capture 11, video image encoder 12, data transmitter 13, privacy-protected video image processor 14, and controller 15. Capture 11 includes an imaging element such as a charge coupled device (CCD) or a complementary metal oxide semiconductor (CMOS) that captures an optical image from a subject through an optical lens. The capture may be a device in which a fish-eye lens is mounted on the front surface and can capture an omni-directional image.

Video image encoder 12 compresses and encodes the data of the privacy non-protected video image and the privacy-protected video image respectively output from capture 11 and privacy-protected video image processor 14 and then, outputs the encoded data. For example, an MPEG (Moving Pictures Experts Group) 4, H.264, or a JPEG (Joint Photographic Experts Group) is used as a method of compression and encoding the video data.

Data transmitter 13 transmits the data of the privacy-protected video image and the data of the privacy non-protected video image compressed and encoded by video image encoder 12 to recorder 20 via a communication line (for example, a wired communication line or a wireless communication line). Data transmitter 13 may convert the video image data to packed data, and then, may transmit the packet data to recorder 20 via an IP network.

Privacy-protected video image processor 14 as an example of an image processor sets a predetermined range (refer to area AR1 in FIG. 5) in which the mask processing is not performed in the target monitoring area, and extracts an image (refer to image GZ1 in FIG. 6) of a first specific region corresponding to the predetermined range among the video image data captured by capture 11, and then, outputs the image as it is. Here, the first specific region from which the image of the first specific region corresponding to the predetermined range is output is set by controller 15.

In addition, privacy-protected video image processor 14 extracts an image in a region other than the first specific region corresponding to the target area (refer to area AR2 in FIG. 5) in which the privacy-protection processing is performed, detects a moving portion included in the video image data captured by capture 11 as, for example, a person, performs the mask processing on this moving portion, and then, outputs the image (refer to image GZ2 in FIG. 6) in which the privacy-protection processing is performed.

In addition, privacy-protected video image processor 14 sets a predetermined range (refer to area AR11 in FIG. 9) where a person is continuously present in the target monitoring area and thus, the mask processing is performed, and outputs the mask-processed image (refer to image GZ11 in FIG. 10) of a second specific region corresponding to the predetermined range. Here, the second specific region from which the image corresponding to the predetermined range is output is set by controller 15.

Controller 15 performs overall control on an operation of each part of monitoring camera 10. In addition, controller 15 includes specific region storage 15z that stores the first specific region in which the mask processing is not performed at all times and the second specific region in which the mask processing is performed at all times that are set in privacy-protected video image processor 14.

Here, the mask processing of painting out the image of a whole person is performed as image processing in order to hide or not to specify the person. However, another processing may be performed not limited to the mask processing. In addition, as long as the person is not specified, image processing so as to hide a part of the person may be performed. For example, instead of painting out the image as the mask processing, processing of putting a mask on the face of the person, cutting out the image of the person, replacing the person with an avatar, or the like may be performed. In addition, instead of the mask processing, effect processing such as a mosaic, a swirl, a blur, dotting, or the like may be performed.

An operation of monitoring camera system 5 having the above configuration will be described.

In monitoring camera system 5, the data of the privacy-protected video image and the data of the privacy non-protected video image are output from monitoring camera 10. Recorder 20 stores this video image data in time series. When receiving a request from PC 30 or PC 40, recorder 20 outputs the video image data sent from monitoring camera 10 to PC 30 or PC 40 in real time or at an arbitrary timing after the storage. At this time, monitoring camera 10 outputs the video image data itself captured by capture 11 as the privacy non-protected video image, or outputs the video image data as the privacy-protected video image in which the mask processing is performed on the video image data captured by capture 11.

When the data of the privacy-protected video image or the data of the privacy non-protected video image is input via recorder 20, administrator's PC 30 displays the privacy-protected video image or the privacy non-protected video image on display 30z according to the display setting. On the other hand, when the data of the privacy-protected video image is input from recorder 20, general user's PC 40 displays the privacy-protected video image on display 40z.

Figure 3:
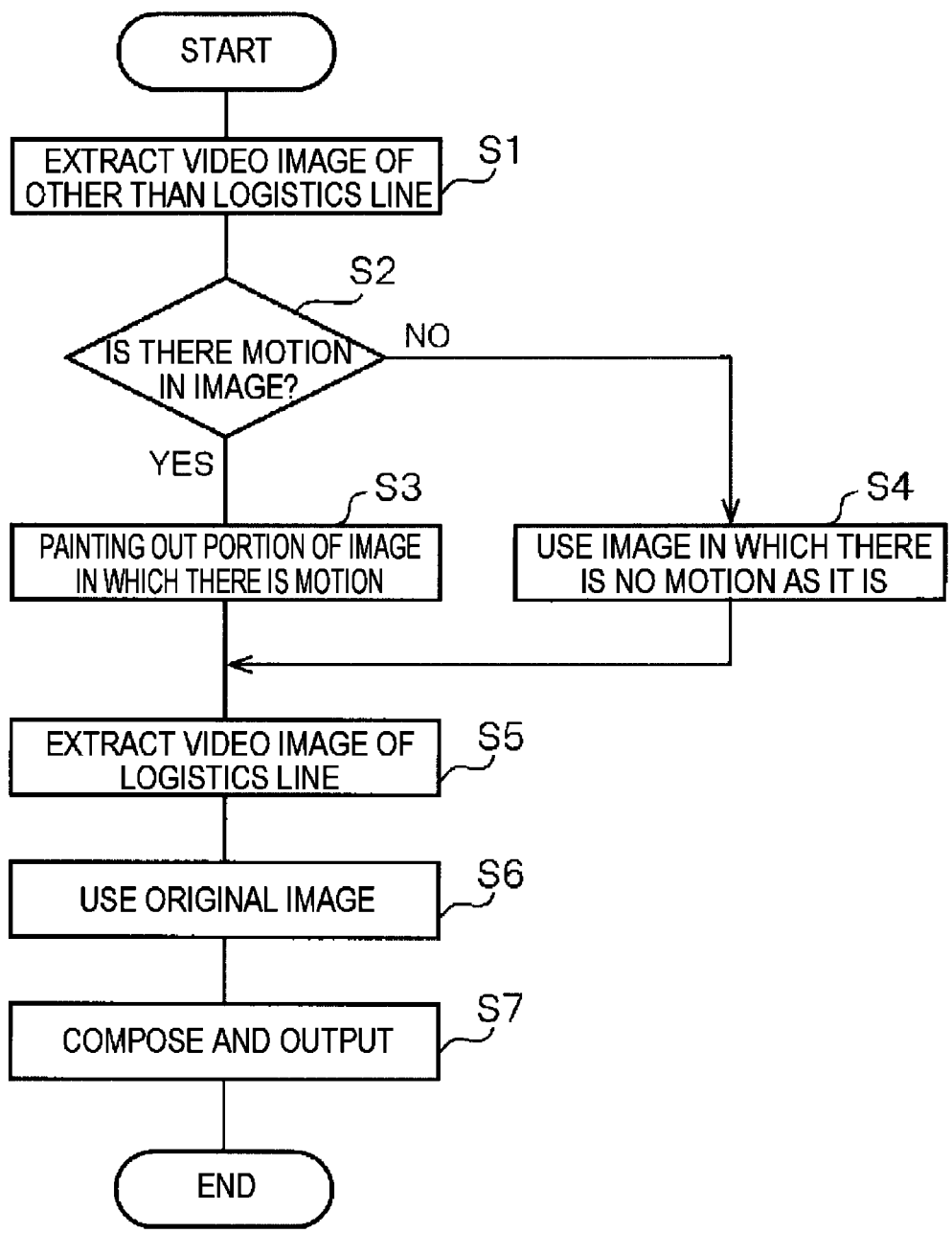
FIG. 3 is a flowchart illustrating an example of a video image processing procedure when monitoring a logistics line as a line of motion.

In a Case where a Target Monitoring Area is a Logistics Line as a Line of Motion Firstly, for example, a case of monitoring an area including a moving logistics line on which a belt conveyor (hereafter, referred to as simply "a conveyor") that transports articles is installed, is illustrated. FIG. 3 is a flowchart illustrating an example of a video image processing procedure when monitoring a logistics line (an example of a first area) as a line of motion. This video image processing is performed by privacy-protected video image processor 14 in monitoring camera 10.

Figure 4:
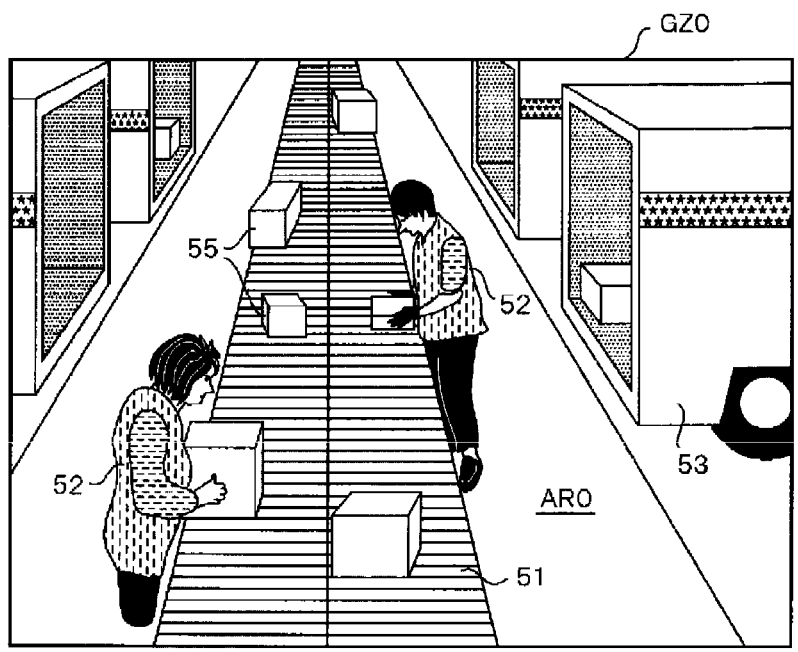
FIG. 4 is a picture illustrating an original image of a target monitoring area including a logistics line captured by a capture.

FIG. 4 is a picture illustrating original image GZ0 of target monitoring area AR0 including a logistics line captured by capture 11. In original image GZ0, a scene is reflected, in which conveyor 51 is installed at the center and workers 52 standing at both sides of the conveyor are picking up luggage 55 transported by conveyor 51. Conveyor 51 transports luggage 55 carried-in from an aircraft (not illustrated) so as to flow from the front side (bottom side in the picture) to the back side (upper side in the picture) in the morning, and transports luggage 55 transported from truck 53 so as to flow from the back side (upper side in the picture) to the front side (bottom side in the picture) in the afternoon. In addition, in the right and left sides of original image GZ0, multiple trucks 53 are aligned, and luggage 55 transported by conveyor 51 is loaded into truck 53 by workers 52 through an open rear gate.

Figure 5:
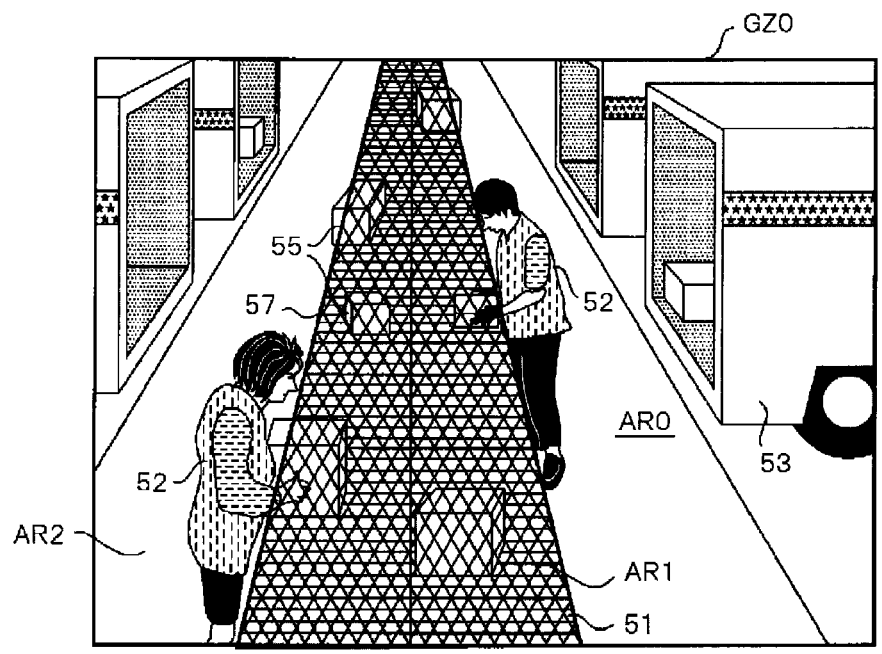
FIG. 5 is a picture illustrating an area in which privacy-protection processing is not performed and an area in which the privacy-protection processing is performed on the original image captured by the capture in the target monitoring area.

Firstly, privacy-protected video image processor 14 extracts a video image of other than the logistics line (refer to FIG. 5) from the video image captured by capture 11 (S1). The video image of other than the logistics line is an image of area AR2 in which the privacy-protection processing is performed. On the other hand, the video image of the logistics line is an image of area AR1 in which the privacy-protection processing (mask processing) is not performed. FIG. 5 is a picture illustrating area AR1 in which the mask processing is not performed and area AR2 in which the privacy-protection processing is performed on original image GZ0 captured by capture 11 in target monitoring area AR0. Area AR1 in which the mask processing is not performed is a range drawn in trapezoid frame 57 so as to surround conveyor 51. On the other hand, area AR2 in which the privacy-protection processing is performed is a portion other than the range drawn in trapezoid frame 57 among target monitoring area AR0.

Privacy-protected video image processor 14 determines whether or not there is motion in the image of area AR2 in which the privacy-protection processing is performed among the video image captured by capture 11 (S2). That is, privacy-protected video image processor 14 calculates the difference between a background image and a currently captured image and extracts an image portion of the difference. Here, the background image is an image repeatedly (for example, 10 times in one second) captured and learned by monitoring camera 10. Therefore, even in a case where a person is detected in the captured image, if the person does not move, then, there may be a case where the person is sunk into the background by a learning effect. Alternatively, the background image may be an image once captured by monitoring camera 10 when there is no person.

Privacy-protected video image processor 14 performs processing of painting out (so called, the mask processing as an example of processing treatment) the portion of the image in which it is determined that there is motion as a result of the occurrence of the difference in STEP S2 (S3). On the other hand, privacy-protected video image processor 14 does not perform the processing of painting out the portion of the image in which it is determined that there is no motion because no difference occurred in STEP S2, and then, uses the image as it is (S4).

After the processing tasks in STEPs S3 and S4, privacy-protected video image processor 14 extracts a video image (refer to FIG. 5) of the logistics line from the video image captured by capture 11 (S5). The video image of the logistics line is an image of area AR1 in which the privacy-protection processing (mask processing) is not performed as described above. Privacy-protected video image processor 14 uses the extracted image of area AR1 as it is without performing the painting-out processing (S6).

Privacy-protected video image processor 14 composes each image resulting from the processing tasks in STEPs S3, S4, and S6 and then, outputs the result (S7). Thereafter, privacy-protected video image processor 14 ends the present operation.

Figure 6:
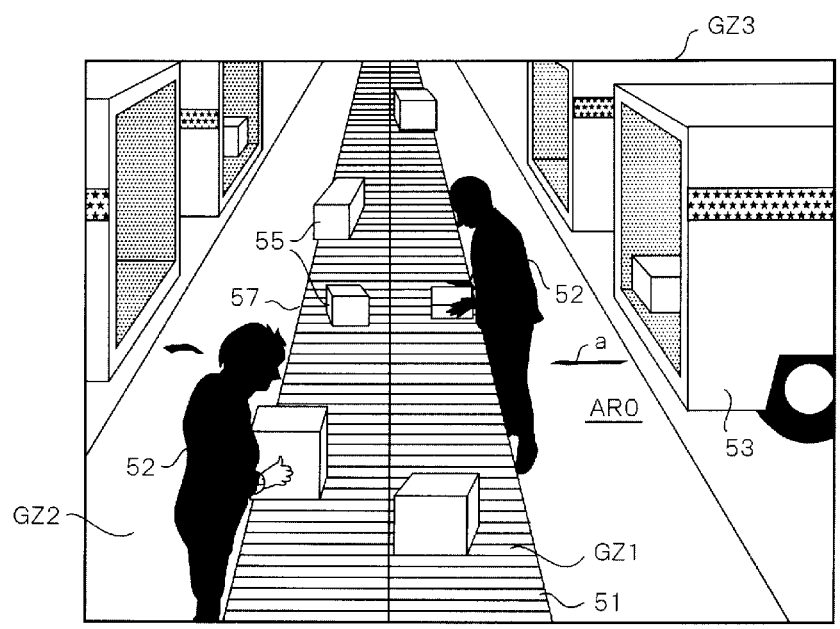
FIG. 6 is a picture illustrating a composite image after the privacy-protection processing is performed on the original image in FIG. 4.

FIG. 6 is a picture illustrating composite image GZ3 after the privacy-protection processing is performed on original image GZ0 in FIG. 4. Among composite image GZ3, in image GZ2 corresponding to area AR2, in which the privacy-protection is performed, the mask processing is performed on the image of workers 52. Since the painting-out processing is performed on this image, it is not possible to identify workers 52. In addition, even in the images of other than workers 52, the mask processing is slightly performed on the portion (refer to sign a in the picture) different from the background image.

As described above, in a case of monitoring the line of motion (logistics line) as a target monitoring area, privacy-protected video image processor 14 displays image GZ1 of the first specific region in which the mask processing is not continuously performed on area AR1 (a predetermined range) of the logistics line in target monitoring area AR0, on display 40z. Therefore, it is possible to suppress the deterioration of the image due to the mask processing performed on the image in the range needed to be continuously monitored.

In addition, privacy-protected video image processor 14 performs the mask processing on a person detected in the region other than the first specific region where the privacy-protection processing is performed among the images displayed on display 40z. Therefore, it is possible for many users to view the images on display 40z without harming the privacy of the person in the region other than the first specific region. Therefore, in the article delivery system to which monitoring camera system 5 in the present embodiment is applied, in a case where there is an accident such as a loss or damage of the luggage, it is possible to efficiently and rapidly cope with the accident by many staff members seeing the video image. In this way, it is possible to efficiently and rapidly check the video image by many persons seeing the video image while suppressing the deterioration of the image obtained by imaging the range set in the area and attempting the protection of the privacy. In addition, the video image in which the mask processing is performed can be stored in the recorder, and thus, it is possible to check the video image after the capturing, not in real time.

In a Case where a Target Monitoring Area is an Inspection Station as a Line of No-Motion Next, a case where a target monitoring area is, for example, an inspection station is illustrated as a line of no-motion. In the inspection station, the workers perform checking of the presence or absence of shipping labels on the luggage, an X-ray examination of the inside of the luggage, or the like. The luggage is put on a desk and the workers perform the examination sitting on chairs. Therefore, motions of the luggage and the workers are small.

Figure 7:
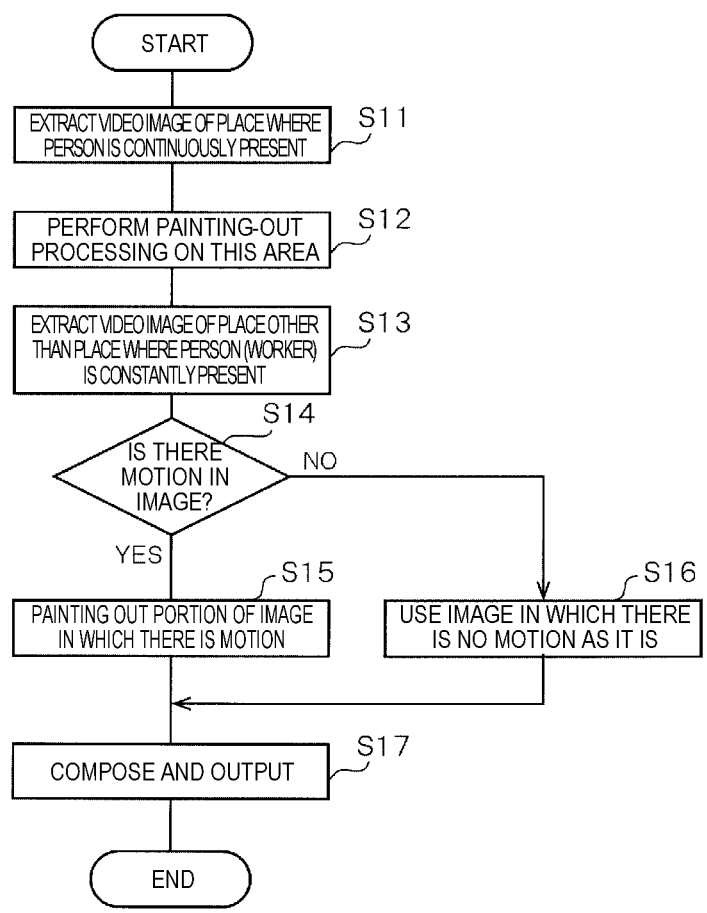
FIG. 7 is a flowchart illustrating an example of a video image processing procedure when monitoring an inspection station (an example of a second area) as a line of no-motion.
Figure 8:
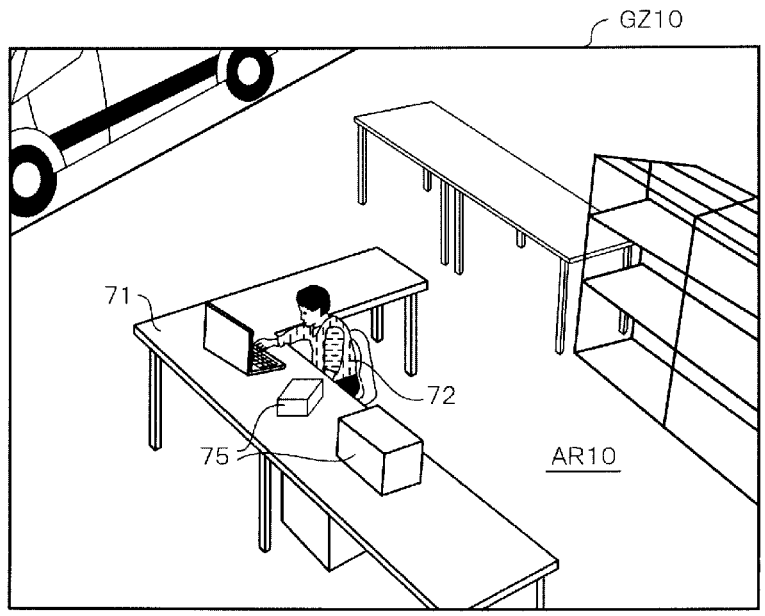
FIG. 8 is a picture illustrating an original image of a target monitoring area including the inspection station captured by the capture.

FIG. 7 is a flowchart illustrating an example of a video image processing procedure when monitoring an inspection station (an example of a second area) as a line of no-motion. This video image processing is performed by privacy-protected video image processor 14 in monitoring camera 10. FIG. 8 is a picture illustrating original image GZ10 of target monitoring area AR10 including the inspection station captured by capture 11. In this original image GZ10, a scene is reflected, in which L-shaped desk 71 is placed at the center, and worker 72 is sitting on a chair inside of desk 71 and investigating luggage 75 put on desk 71.

Figure 9:
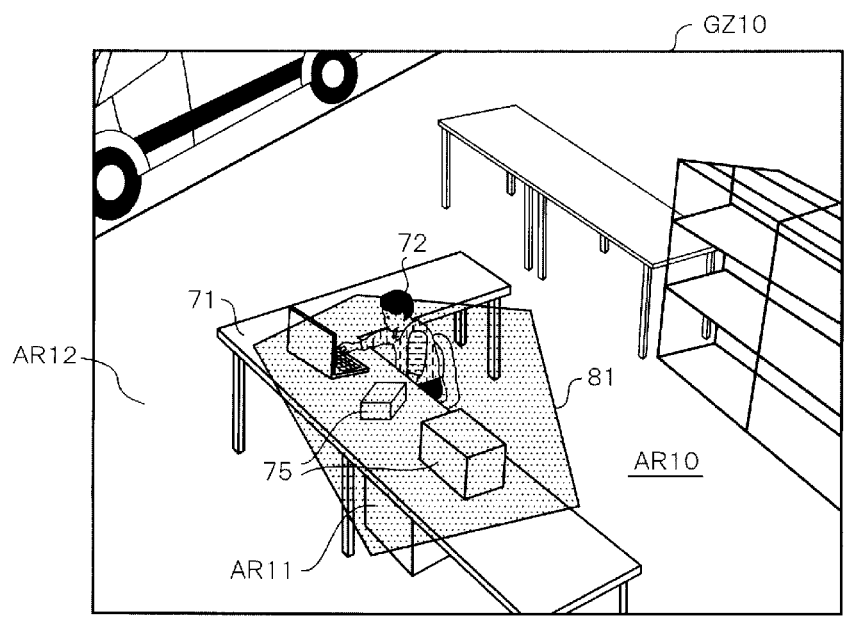
FIG. 9 is a picture illustrating an area in which mask processing is constantly performed on the original image captured by the capture in the target monitoring area.

Firstly, privacy-protected video image processor 14 extracts a video image (refer to FIG. 9) of a place where a person (worker) is continuously present (area AR11 where the mask processing is constantly performed) from the video image captured by capture 11 (original image GZ10) (S11). FIG. 9 is a picture illustrating area AR11 in which mask processing is constantly performed on original image GZ10 captured by capture 11 in target monitoring area AR10. Area AR11 in which the mask processing is constantly performed is a place where the person (worker) described above is continuously present, and here, the area is illustrated as pentagonal frame 81 on the inside of which is drawn in dots in original image GZ10. On the other hand, a portion except area AR11 from target monitoring area AR10 is area AR12 in which the privacy-protection processing is performed.

Privacy-protected video image processor 14 performs the mask processing on the video image of area AR11 and acquires the mask-processed image (refer to image GZ11 of the second specific region in FIG. 10) (S12). Here, image GZ11 of the second specific region corresponding to area AR11 is painted out in a polygonal shape (for example, pentagonal shape) so as to cover area AR11. In addition, privacy-protected video image processor 14 makes a part of head of worker 72 protrude from the painted-out portion as a result of the mask processing, and thus, it is possible to understand that worker 72 is present at this place.

Subsequently, from the video image captured by capture 11, privacy-protected video image processor 14 extracts the video image of the place other than the place where the person (worker) is constantly present, that is, area AR12 in which the privacy-protection processing is performed (S13). Then, privacy-protected video image processor 14 performs the processing tasks in STEPs S14, S15, and S16 described below which are the same as those in STEPs S2, S3, and S4.

Privacy-protected video image processor 14 determines whether or not the image of area AR12 where the privacy-protection processing is performed among the video image captured by capture 11 contains motion (S14). Privacy-protected video image processor 14 calculates the difference between the background image and the currently captured image and extracts the image portion of the difference.

Privacy-protected video image processor 14 performs processing of painting out (so called, the mask processing as an example of processing treatment) the portion of the image in which it is determined that there is motion as a result of occurrence of the difference in STEP S14 (S15). On the other hand, privacy-protected video image processor 14 does not perform the processing of painting out the portion of the image in which it is determined that there is no motion because no difference occurred in STEP S14, and then, uses the image as it is (S16).

Figure 10:
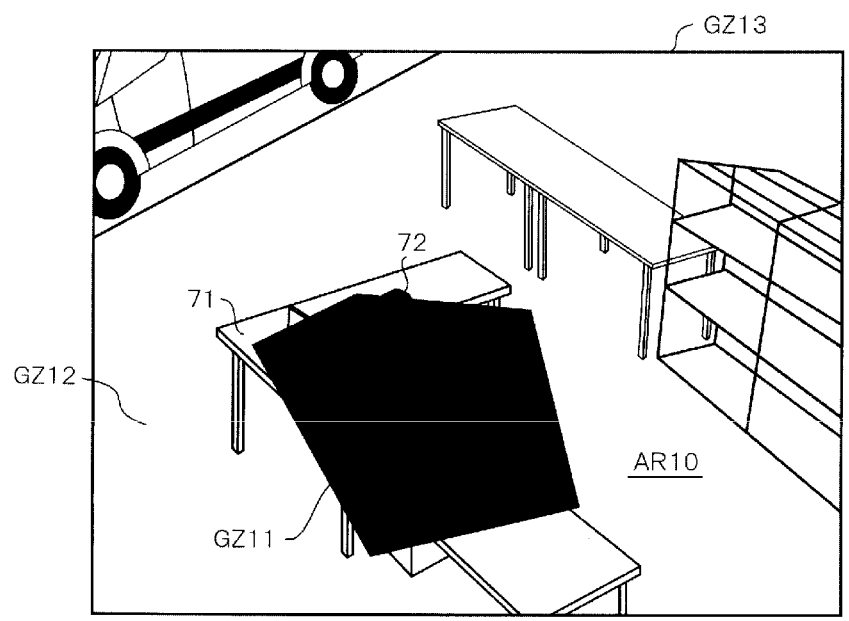
FIG. 10 is a picture illustrating a composite image including an image in which the mask processing is constantly performed on the original image in FIG. 8.

Then, privacy-protected video image processor 14 composes each image resulting from the processing tasks in STEPs S12, S15, and S16 and then, outputs the result (S17). FIG. 10 is a picture illustrating composite image GZ13 including image (image GZ11 of the second specific region) in which the mask processing is constantly performed on original image GZ10 in FIG. 8. In this composite image GZ13, there is no person present in area AR12 in which the privacy-protection processing is performed. Therefore, the mask processing is not performed on image GZ12 in which the privacy-protection processing is performed. Thereafter, privacy-protected video image processor 14 ends the present operation.

In this way, in a case of monitoring the inspection station which is the line of no-motion as, for example, a target monitoring area, image GZ11 of the second specific region in which the mask processing is constantly performed is output with respect to area AR11 (a predetermined range) where the person (worker) in target monitoring area AR10 is continuously present. Therefore, it is possible to surely protect the privacy of the person already known as being present in this range.

In a Case where a Target Monitoring Area is a Place where a Line of Motion and a Line of No-Motion are Present in a Mixed Manner For example, as described above, a case where the target monitoring area is a place where a logistics line as a line of motion and an inspection station as a line of no-motion are present in a mixed manner is illustrated. In this case, the original image of the target monitoring area captured by capture 11 includes the image (image of the first specific region) of the area in which the mask processing is not constantly performed due to being the logistics line, the image (image of the second specific region) of the area in which the mask processing is constantly performed due to being the place where the person (worker) is continuously present, and the image of the area in which the privacy-protection processing is performed other than the above-described area.

Figure 11:
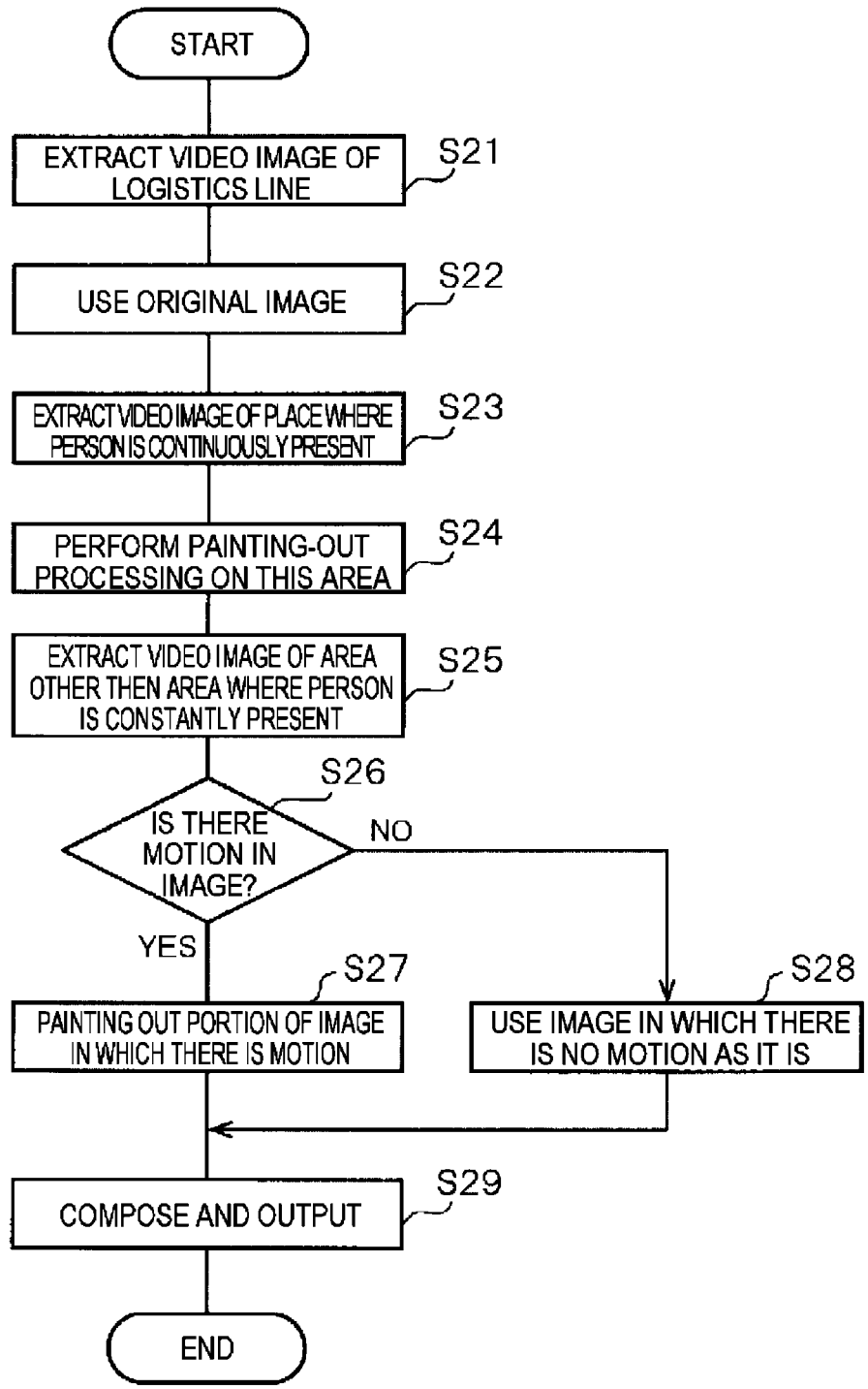
FIG. 11 is a flowchart illustrating an example of a video image processing procedure by a privacy-protected video image processor when monitoring a place where the line of motion and the line of no-motion are present in a mixed manner.

FIG. 11 is a flowchart illustrating an example of a video image processing procedure by privacy-protected video image processor 14 when monitoring the place where the line of motion and the line of no-motion are present in a mixed manner. In this case, privacy-protected video image processor 14 performs video image processing in which the video image processing when monitoring the logistics line as the line of motion described above and the video image processing when monitoring the inspection station as the line of no-motion described above are combined.

That is, privacy-protected video image processor 14 performs the same processing tasks as those in STEPs S5 and S6 in FIG. 3 described above and outputs the image (image of the first specific region) of the area in which the privacy-protection processing is not performed (S21 and S22). Subsequently, privacy-protected video image processor 14 performs the same processing tasks as those in STEPs S11 and S12 in FIG. 7 described above and outputs the image (image of the second specific region) of the area in which the mask processing is constantly performed (S23 and S24).

Furthermore, privacy-protected video image processor 14 performs the same processing tasks as those in STEPs S2, S3, and S4 in FIG. 3 described above with respect to the image of the region except the first specific region and second specific region, and outputs the image in which the privacy-protection processing is performed (S26, S27, and S28). Then, privacy-protected video image processor 14 composes each image resulting from the processing tasks in STEPs S22, S24, S27, and S28 and then, outputs the result (S29). Thereafter, privacy-protected video image processor 14 ends the present operation.

In this way, it is possible to output a composite image as one video image, in which the image of the first specific region in which the mask processing is not constantly performed, the image of the second specific region in which the mask processing is constantly performed, and the image in which the mask processing is performed on the person detected in the region other than the above first and second specific regions are composed. In this way, even in a case of a place where a logistics line and stationed persons are present in a mixed manner, images suitable for each of those can be output, and in a case where there is an accident such as a loss or damage of the luggage, it is possible to efficiently and rapidly cope with the accident by many staff members seeing the video image. In other words, even in a case where there is an accident such as a loss or damage of the luggage, a person who views the video image of the accident occurring is not limited to a specific person (for example, an officer or a person having corresponding authority), and thus, it is possible to quickly check the situation of the accident occurring. In this way, it is possible to efficiently and rapidly check the video image by many persons seeing the video image while attempting the protection of the privacy with suppressing the deterioration of the video image of the range needed to be constantly monitored in the target monitoring area.

As described above, various embodiments are described with reference to the drawings. However, it is needless to say that the present invention is not limited to the described examples. It is apparent that those skilled in the art can perceive various changes or modification examples within the scope of the aspects and it is understood that those can also be included in the technical range of the present invention.

For example, in the embodiment described above, in a case where a person is detected in the video image, an image representing a difference between a learned video image of the previous procedure and the currently captured image is used. However, a method of detecting a person is not limited to the above. However, for example, data representing characteristics of a person (face image or a feature amount) is registered in advance, and in a case where the data representing characteristics of the person is detected from the captured image, then, the person may be specified.

What is claimed is:

1. An article delivery system, comprising:
a camera positioned adjacent to a conveyor and configured to capture an image of the conveyor and an area surrounding the conveyor, wherein the conveyor is configured to move articles placed thereon;
at least one display; and
a processor coupled to the camera and the display, wherein the processor, in operation:
extracts a first image of the conveyor out of the image captured by the camera;
in a second image other than the first image out of the image, detects a person included in the second image and applies mask processing to the person in the second image;
extracts a third image of a location at which a person is continuously present out of the second image and applies mask processing to the location; and
outputs a composite image of the first image, the second image minus the third image, and the third image to the display, where the first image shows the conveyor, the second image minus the third image shows the area surrounding the conveyor in which the person is masked, and in the third image the location at which a person is continuously present is masked.

2. The article delivery system of claim 1 further comprising:
a storage device that stores the image output from the camera.

3. A method of monitoring an article delivery system which includes a camera, at least one display, and a processor coupled to the camera and the display, the method comprising:
positioning the camera adjacent to a conveyor configured to move articles thereon;
operating the camera to capture an image of the conveyor and an area surrounding the conveyor and forwarding the image to the processor;
extracting, in the processor, a first image of the conveyor out of the image captured by the camera;
in a second image other than the first image out of the image, detecting a person included in the second image and applying mask processing to the person in the second image;
extracting a third image of a location at which a person is continuously present out of the second image and applying mask processing to the location; and
outputting a composite image of the first image, the second image minus the third image, and the third image from the processor to the display, where the first image shows the conveyor, the second image minus the third image shows the area surrounding the conveyor in which the person is masked, and in the third image the location at which a person is continuously present is masked.

4. A camera device used in an article delivery system, the camera device comprising:
a camera positioned adjacent to a conveyor and configured to capture an image of the conveyor and an area surrounding the conveyor, wherein the conveyor is configured to move articles placed thereon, and an image processor coupled to the camera and which, in operation:

extracts a first image of the conveyor out of the image captured by the camera;

in a second image other than the first image out of the image, detects a person included in the second image and applies mask processing to the person in the second image;

extracts a third image of a location at which a person is continuously present out of the second image and applies mask processing to the location; and outputs a composite image of the first image, the second image minus the third image, and the third image to a display, where the first image shows the conveyor, the second image minus the third image shows the area surrounding the conveyor in which the person is masked, and in the third image the location at which a person is continuously present is masked.

* * * * *